United States Patent Office 3,360,512
Patented Dec. 26, 1967

3,360,512
FORMALDEHYDE DERIVATIVES OF STARCH
Jerry W. Moore, Clinton, Iowa, assignor to Standard Brands Incorporated, New York, N.Y., a corporation of Delaware
No Drawing. Filed June 1, 1964, Ser. No. 371,841
10 Claims. (Cl. 260—233.3)

This invention relates to formaldehyde derivatives of starch and to a method of preparing such derivatives.

There are many references in the literature to the reaction of aldehydes with starch and to a wide variety of products produied by this reaction. The reaction is recognized as being qnite complex and it is not thoroughly understood.

It was known that formaldehyde will react with starch under acid conditions, but prior workers did not know how to control the reaction to yield uniform products of predictable properties.

An object of the invention is to provide a method of controlling the reaction between formaldehyde and starch under acid conditions. Another object of the invention is to provide novel formaldehyde derivatives of starch.

I have discovered that the reaction between formaldehyde and starch in the presence of a mineral acid catalyst is very sensitive to variations in the concentration of acid. Small variations result in large differences in the characteristics of the resultant products. Such small variations are not detectable by pH measurement.

In accordance with the invention, formaldehyde and starch are reacted in an aqueous slurry in the presence of a carefully controlled amount of mineral acid, while maintaining the starch in ungelatinized granular form. The amount of acid is controlled to provide a filtrate acidity in the range between about 9 and 11 and preferably at 10. The filtrate acidity is the number of ml. of 0.1 N sodium hydroxide required to neutralize a 50 ml. portion of reaction medium filtrate to a pink phenolphthalein end-point. Filtrate acidities of 9 to 11 are obtained with molar concentrations of HCl between 0.018 and 0.022, respectively.

The starch concentration is not critical. Water slurries of 17–21 Bé (30–37% starch by weight) are convenient. The amount of formaldehyde employed is dependent upon the viscosity characteristics desired in the reaction product and may be in the range from a fraction of 1% upward. A range from about 0.25 to 5% paraformaldehyde has been successful. The reaction may be carried out at any temperature below the temperature at which the starch would gelatinize, for instance, at 118–122° F. The reaction time depends upon the viscosity characteristics desired in the reaction product and may be, for instance, in the range from 1 to 5 hours.

It is convenient to employ formaldehyde in the form of the polymer, paraformaldehyde. In this case, a water slurry containing the starch and paraformaldehyde is prepared, and sufficient alkali is added to disperse and dissolve the paraformaldehyde. The time required to do this will depend upon the size of the batch and the type of agitation available. A pH in the range of 8.3 to 8.5 is sufficient. After the paraformaldehyde has been dispersed and dissolved, the slurry is neutralized and sufficient mineral acid is added to provide a filtrate acidity of 9–11 to bring about the desired reaction between the formaldehyde and the starch.

When the reaction has proceeded to the desired extent, sufficient alkali is added to the slurry to terminate the reaction. This occurs at a pH above about 3.0, for instance, in the range from 4.0 to 8.0. The preferred pH is 4.0 since maximum viscosity and stability in the product is obtained at this level. The starch product can be separated from the slurry easily by conventional means, for instance, by filtration.

In order more clearly to disclose the nature of the present invention, specific examples will hereinafter be described. It should be understood, however, that this is done solely by way of example and is intended neither to delineate the scope of the invention nor limit the ambit of the appended claims. In the examples and throughout this specification, percentages are intended to refer to percent by weight, unless otherwise specified.

*Example 1*

Sufficient sodium carbonate was added to a slurry of 35 percent dry substance common corn starch in water to adjust the pH to 8.5. This slurry was heated to 120° F. and held at this temperature during the reaction. One percent by weight of powdered paraformaldehyde based on the dry starch was added to the reaction medium. After two hours of agitation, sufficient hydrochloric acid was added to the slurry to produce a filtrate acidity of 10. This acid content of the reaction slurry is critical and a considerable amount of care was exercised in adjusting the filtrate acidity to 10 (water in the slurry was 0.02 N acid). At the end of 5 hours, the reaction was stopped by raising the slurry pH to 4.0 by adding sodium hydroxide. The starch product was recovered from the slurry by filtration, and dried.

*Example 2*

This example illustrates the use of my method of control in the reaction of starch with less than 1% formaldehyde. To an aqueous slurry of 35%, dry substance common corn starch sodium hydroxide was added to obtain a pH of 8.5. The temperature of the slurry was maintained at 120° F. (±2°) and 0.25% powdered paraformaldehyde, based on the dry starch, was added. The slurry was agitated for two hours during which time the powdered paraforamldehyde was dispersed and dissolved. Hydrochloric acid was added to obtain a filtrate acidity of 10. One hour was allowed for the formaldehyde to act on the starch. The product was recovered by filtration, and dried. Its viscosity characteristics compared to those of common corn starch were similar when measured by the Corn Industries' Viscometer, but sufficiently different when measured by the Hercules High Shear Viscometer to make it preferable in certain industrial applications.

*Example 3*

This example demonstrates the effect of varying the acid content of the reaction medium.

The procedure of Example 1 was repeated except that the filtrate acidity was adjusted to 12 instead of 10. After 5 hours' reaction, the product was cross-linked to an extent that the hot paste viscosity was reduced to one half that of a product prepared at 10 filtrate acidity and was not suitable as a thick boiling starch. In terms of acid content, this was only a molar concentration difference of 0.004. The procedure of Example 1 was repeated again except that the filtrate acidity was adjusted to 8 instead of 10. The product obtained was essentially the same as the parent common corn starch in hot paste viscosity.

To determine filtrate acidity in the foregoing examples, a portion (approximately 200 ml.) of the reaction medium was removed and filtered through a Buchner funnel under vacuum. A 50 ml. portion of the filtrate was titrated with 0.1 N sodium hydroxide to a pink phenolphthalein end-point. The number of ml. of sodium hydroxide required was taken as the filtrate acidity value.

The starch products obtained by my process are the same in appearance and as easily dispersible in water as the parent starch from which they are made. They are cross-linked to a slight degree and on heating in water, gelatinize to form a thick gel whose hot paste viscosity is higher than that of the unmodified parent starch. The viscosity is stable when the gel is heated and held. The products of the invention can be used, for instance, for the same purposes for which thick boiling starches are employed.

The terms and expressions which have been employed are used as terms of description and not of limitation, and it is not intended, in the use of such terms and expressions, to exclude any equivalents of the features shown and described or portions thereof, since it is recognized that various modifications are possible within the scope of the invention claimed.

What is claimed is:

1. In the process of preparing formaldehyde derivatives of starch by reacting formaldehyde and starch, the improvement which comprises reacting said formaldehyde and starch at a temperature below the gelatinization temperature of the starch in an aqueous slurry having a filtrate acidity of 9–11.

2. A process as defined in claim 1 wherein the filtrate acidity is 10.

3. A formaldehyde derivative of starch prepared by the process defined in claim 1.

4. A formaldehyde derivative of starch prepared by the process defined in claim 2.

5. The process defined in claim 1, wherein the formaldehyde provided in the aqueous slurry is in the form of paraformaldehyde.

6. The process defined in claim 5, wherein the amount of paraformaldehyde provided in said slurry is in the range from about 0.25 to about 5 percent by weight based on the weight of the starch.

7. The process defined in claim 6, wherein the starch and formaldehyde are allowed to react from about one to about five hours.

8. The process defined in claim 7, wherein the temperature of the slurry during the reaction is in the range from about 118° F. to about 122° F.

9. The process defined in claim 5, wherein the paraformaldehyde is dissolved in the aqueous slurry at a pH from about 8.3 to about 8.5.

10. The process defined in claim 7, wherein the reaction is terminated by adjusting the slurry pH to above about 3.

References Cited

UNITED STATES PATENTS

| | | | |
|---|---|---|---|
| 2,113,034 | 4/1938 | Rowland et al. | 260—233.3 |
| 3,238,193 | 3/1966 | Tuschhoff et al. | 260—233.3 |

OTHER REFERENCES

Kerr, "Chemistry and Industry of Starch," Academic Press, New York (1950), pp. 466–472.

DONALD E. CAZAJA, *Primary Examiner.*

L. J. BERCOVITZ, *Examiner.*

R. W. MULCAHY, *Assistant Examiner.*